United States Patent [19]

Faust

[11] Patent Number: 5,637,647
[45] Date of Patent: Jun. 10, 1997

[54] CAPPING OF LIVING POLYMERS

[75] Inventor: Rudolph Faust, Lexington, Mass.

[73] Assignee: University of Massachusetts Lowell, Lowell, Mass.

[21] Appl. No.: 323,201

[22] Filed: Oct. 14, 1994

Related U.S. Application Data

[63] Continuation-in-part of Ser. No. 137,684, Oct. 15, 1993, abandoned.

[51] Int. Cl.$^6$ .................................................. C08F 8/00
[52] U.S. Cl. ................................................... 525/319
[58] Field of Search ....................................... 525/319

[56] References Cited

U.S. PATENT DOCUMENTS

| | | | |
|---|---|---|---|
| 4,956,485 | 9/1990 | Leitz et al. | 556/446 |
| 5,081,251 | 1/1992 | Bender et al. | 546/350 |
| 5,153,291 | 10/1992 | Leitz et al. | 526/279 |
| 5,321,093 | 6/1994 | Bronstert et al. | 525/314 |

FOREIGN PATENT DOCUMENTS

| | | |
|---|---|---|
| 0002012 | 5/1979 | European Pat. Off. . |
| 0374553 | 12/1988 | European Pat. Off. . |
| 0442068 | 2/1990 | European Pat. Off. . |
| 149708 | 7/1987 | Japan . |
| 91/04993 | 4/1991 | WIPO . |

*Primary Examiner*—Bernard Lipman
*Attorney, Agent, or Firm*—Hamilton, Brook, Smith & Reynolds, PC

[57] ABSTRACT

The present invention provides a process for the capping of a living polymer with one or more capping compounds comprising non-polymerizable monomer, preferably selected from the group consisting of substituted or unsubstituted diphenyl alkylene, substituted or unsubstituted α-methoxystyrene, substituted or unsubstituted trans-stilbene, substituted or unsubstituted 1-isopropenylnapthalene and substituted or unsubstituted 2,4-dimethyl-α-methylstyrene.

6 Claims, No Drawings

CAPPING OF LIVING POLYMERS

This application is a continuation-in-part of U.S. application Ser. No. 08/137,684, filed Oct. 15, 1993, now abandoned.

FIELD OF THE INVENTION

The present invention provides a process for the capping of a living polyolefin chain end, preferably a polyisobutylene chain end. This provides, among other things, an efficient method for introducing functional groups at the polymer chain end, and an efficient method for the preparation of copolymers and block copolymers based on polyisoolefins and styrenic monomers.

BACKGROUND OF THE INVENTION

Living polymerizations, i.e., polymerizations that proceed in the absence of termination and chain transfer are a most desirable objective of the synthetic chemist. Living polymerizations yield polymers with well defined structures, controlled molecular weight, controlled molecular weight distributions (Mw/Mn) and controlled end functionalities.

In the last decade considerable accomplishments have been made in living carbocationic polymerizations to achieve molecular weight and Mw/Mn control. Some advances have also been made in the synthesis of block copolymers by sequential monomer addition. In copending U.S. Ser. No. 07/730,363, filed Jul. 15, 1991, now abandoned, this technique was used for the preparation of polystyrene-polyisobutylene-polystyrene triblock copolymer thermoplastic elastomers. With many monomer pairs, however, such as isobutylene-paramethylstyrene or vinyl ethers (A. V. Lubin and J. P. Kennedy, J.Polym. Sci., Polym. Chem., 31, 2825, 1993) or α-methylstyrene (Y. Tsunogea and J. P. Kenedy, J. Polym. Sci., Polym. Chem., 32, 403 1994), a mixture of homo- and/or di- and tri-block copolymers was obtained. The clean synthesis of diblock or triblock copolymers without homopolymer and/or diblock contamination by sequential monomer addition can only be accomplished when the second monomer can be effectively initiated from the living ends. Success also remains limited in the synthesis of functional polymers by in situ functionalization of the living end. For example, only chloro- and allyl-functionalized polyisobutylenes, and chloro-functionalized styrenes could be obtained. This invention provides a method to functionalize the polyolefin chain end, as well as vehicle to produce block copolymers without significant homopolymer contamination.

BRIEF DESCRIPTION OF THE INVENTION

The present invention provides a process to produce capped polyolefin polymers and the products obtained. In general, the process comprises the capping or functionalizing an olefin polymer with one or more capping compounds comprising non-polymerizable monomer. These capped polymers can also be used as functionalized polymers or for the production of block copolymers.

DESCRIPTION OF THE PREFERRED EMBODIMENTS

This invention relates in part to the discovery that 1,1-diphenylethylene can be introduced quantitatively to the living PIB chain end (1,1-diphenylethylene does not homopolymerize for thermodynamic reasons). Furthermore, the clean synthesis of block copolymers can now be achieved by first transforming the polymer chain ends to diphenyl alkyl cations by diphenylethylene capping. The resulting diphenyl alkyl cation is a very efficient initiating species for the polymerization of the second monomer.

In a preferred embodiment, this invention provides a method to cap a living polyolefin cation, preferably a polyisoolefin cation, even more preferably a living polyisobutylene cation ($PIB^+$) with a non-polymerizable monomer, preferably with substituted or unsubstituted diphenylalkenes, preferably substituted diphenylethylenes, even more preferably unsubstituted or substituted 1,1-diphenylethylenes. Mono or multi substitution on the aromatic ring may include methyl-, methoxy-, dimethyl-, amino-, trimethylsiloxy-, groups and the like at different ring positions.

For the purposes of this invention a non-polymerizable monomer is a monomer for which the thermodynamics of polymerization are so unfavorable that no polymerization to high polymer occurs. For further information concerning non-polymerizable monomers see R. Quirk, J. Ren, Makromolecular Chemie, Macromolecular Symposium, 70–71, 133, 1993, which is incorporated by reference herein.

In addition, α-methoxystyrene, trans-stilbene, 1-isopropenylnapthalene and 2,4-dimethyl-α-methylstyrene can be used in place of the diphenyl alkene. Hereinafter, the use of the phrase diphenyl alkylene is merely exemplary and it will be recognized by those of skill in the art that the additional capping compounds listed above may be used in a similar manner. The capped polymer may then be functionalized by quenching with methanol or other nucleophiles including, but not limited to alcohols, Grignard reagents, sodium ethyl malonate, silyl enol esters, silyl enol ethers and the like. Preferred nucleophiles include methyl alcohol, 1-methoxy-1-(trimethylsiloxy)-2-methyl-propene (subsequently hydrolyzed to —COOH end groups), cyclohexeneyloxytrimethylsilane (ketone end groups), phenyl magnesium bromide, lithium diisopropyl amide, sodium diethyl malonate and the like.

Interestingly enough, the 1,1-diphenyl alkene compounds do not homopolymerize due to steric hindrance and thermodynamic reasons but form stable carbocations with the living polyolefin cation.

In a preferred embodiment the living polyolefin is any polyolefin with a terminal cationic group. Typically these polyolefins are those that are made by living polymerization methods known to those of ordinary skill in the art. These living polymers make good candidates for creating living carbocationic sites on the polymer chain specifically because of their living characteristic of being able to polymerize additional monomer, i.e. react, whenever monomer is present long after the initial "polymerization" is complete. For example, polymeric carbocation can be made by reacting a living polymer with an olefin carrying sterically large groups to form a carbocation. In preferred embodiments, polyolefin, preferably, polyisoolefin, polymultiolefin or poly (substituted or unsubstituted vinylidene aromatic compounds) more preferably polyisobutylene, is reacted with a substituted or unsubstituted diphenylalkene (the alkene may contain from 1 to 40 carbon atoms), preferably diphenyl ethylene to create a polymer with a cap of the diphenyl alkene comprising a carbocation. These capped polyolefins with the carbocationic site may then be contacted with another monomer to form a second polymer block attached to the first polyolefin. By this method diblock (and multiblock) copolymers can be synthesized. These block copolymers and the processes to make them are disclosed in a concurrently filed case U.S. Ser. No. 08/137,659, filed Oct. 15, 1994 entitled "Living Polymerization of Olefins to Produce Copolymer."

Preferred polyolefins include $C_4$ to $C_{18}$ polyisomonoolefins, $C_4$ to $C_{14}$ polymultiolefins, and poly(substituted or unsubstituted vinylidene aromatic compounds), preferably $C_4$ to $C_{10}$ polyisomonoolefins, even more preferably $C_4$ to $C_8$ polyisomonoolefins. Polyisobutylene is an example of preferred isoolefin polymer.

One set of reaction conditions that will produce these polymeric carbocations is, in a diluent, contacting the olefin monomer with an initiating system comprising an initiator (usually an organic ether, organic ester, or organic halide) and a co-initiator or Lewis acid ($TiCl_4$ is a preferred co-initiator) and a proton trap. Preferred proton traps include substituted or unsubstituted 2,6-di-tert-butylpyridines. The co-initiator is typically used in concentrations equal to or preferably 2 to 40 times higher than the concentration of the initiator. The concentration of proton trap is preferably slightly higher than the concentration of protic impurities in the polymerization system. Polar and/or non-polar hydrocarbons and halogenated version thereof may be used as the diluent. Methyl chloride mixed with hexane is a preferred diluent composition. The polymerization is typically conducted in a temperature range of from about $-10°$ to about $-100°$ C., preferably from about $-50°$ to about $-90°$ C. for about 10 to about 120 minutes depending on the concentration of the initiator and the co-initiator. Once the desired living polymer is obtained, substituted or unsubstituted diphenylethylene is added to the polymerization media in concentrations equal up to about 10 times the concentration of the living chain ends, preferably about 1 to about 5 times the concentration of the living chain ends, even more preferably about 1 to about 2 times the concentration of the living chain ends. The di-phenylethylene is allowed to react with the living polymer for about 10 minutes to about 5 hours, depending on the concentration of the concentration of the living chain ends and the diphenylethylene.

A preferred method for obtaining 100% capping all is simply to wait. The time to wait will vary with the initiator, co-initiator and diphenylethylene concentrations. With higher initiator concentrations the time is shorter, about 20 minutes, while lower initiator concentrations may require 10 hours to achieve 100% capping.

In preferred embodiments the polymerization processes of this invention (polymerizing monomer to make living polymer) may be conducted in a polymerization zone of a conventional polymerization apparatus, in the presence or in the absence of a diluent. Suitable polymerization conditions include a temperature ranging from about minus $100°$ C. to about plus $10°$ C., preferably from about minus $80°$ C. to about $0°$ C. for a time period ranging from about 1 to about 180 minutes (hours). Preferably, the polymerization reaction mixture may be subjected to agitation using conventional mixing means.

The living polymers of the present invention may be homopolymers, copolymers, terpolymers, and the like depending upon the olefinic chargestock used.

Preferred number average molecular weights (Mn) of the living polymers of the present invention may range from about 500 to about 2,000,000, preferably from about 2,000 to about 100,000. The polymers have a narrow molecular weight distribution such that the ratio of weight average molecular weight to number average molecular weight (Mw/Mn) of the polymers ranges from about 1.0 to about 1.5, preferably from about 1.0 to about 1.2. The polymers may be recovered from the polymerization zone effluent and finished by conventional methods.

The process of the present invention may be conducted in the presence or in the absence of a diluent. Suitable diluents include $C_1$ to $C_4$ halogenated hydrocarbons, such as methyl chloride and methylene dichloride, $C_5$ to $C_8$ aliphatic hydrocarbons, such as pentane, hexane, and heptane and $C_5$ to $C_{10}$ cyclic hydrocarbons, such as cyclohexane and methyl cyclohexane, and mixtures thereof.

If solution phase is chosen, suitable diluents may be single or multi-component diluent systems that dissolve polyisobutylene. Typical diluent or solvent mixtures usually consist of a polar solvent like methyl chloride or methylene chloride and a non-polar solvent hexane, cyclohexane or methylcyclohexane and the like. Polymerization temperatures may be from about $-10°$ C. to about $-100°$ C., preferably $-50°$ C. to $-90°$ C.

The capped polymers produced herein may be used as initiators for further polymerization of similar or different cationically polymerizable monomers. Likewise the "cap" may be quenched with a nucleophile to introduce a particular functional group through nucleophilic substitution. Such functionalized polymers, if made at Mw's of 500 to about 10,000 may be used as fuel/oil additives or lubricants, especially if an amine group is introduced onto the chain end.

EXAMPLES

In the examples that follow, molecular weight was measured by GPC method, using polyisobutylene standards.

The proton trap was 2,6-di-tert-butyl-4-methylpryridine (4MeDTBP) or 2,6-ditert-butylpyridine.

A polyisobutylene chain was capped with 1,1-diphenylethylene (DPE), i.e.,

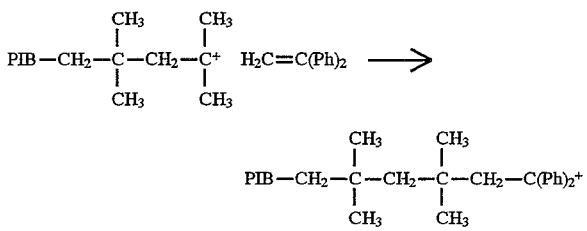

Example 1

Low molecular weight ($M_n$=2000) PIB was prepared using 2,4,4 trimethylpentyl chloride (TMPCl) as initiator and when the isobutylene conversion reached 100% 1,1 diphenylethylene (DPE) was added. The reaction conditions were the following: temperature=$-80°$ C., [TMCPl]= 0.0216M, [IB]$_o$=0.77M, [proton trap]=0.004M, [TiCl$_4$]= 0.0364M, solvent: methyl chloride/methylcyclohexane (MeCl/MeCH) 40/60 v/v mixture. The IB polymerization time was 10 minutes. The DPE was in 0.33M solution prepared using MeCl/MeCH 40/60 mixture and was added in 10% excess to the living end at $-80°$ C. The proton trap was 2,6-di-tert-butyl-4-methylpryridine (4MeDTBP).

According to H$^1$ NMR and GPC measurement with double detection (UV and RI) capping was essentially complete (>95%) after 20 minutes. After quenching with MeOH the polymer carried exclusively —OMe end groups. This indicates that the diphenyl polyisobutenyl cation is fully ionized.

Example 2

Low molecular weight ($M_n$=1700) PIB was prepared using 2,4,4 trimethylpentyl chloride (TMPCl) as initiator and when the conversion reached 100% 1,1 diphenylethylene (DPE) was added. The reaction conditions were the following: temperature=−80° C.; [TMPCl]=0.02M; [IB]$_o$=0.36M; [proton trap]=0.005M; [TiCl$_4$]=0.08M; solvent: methyl chloride/methylcyclohexane (MeCl/MeCH) 40/60 v/v mixture. The IB polymerization time was 70 minutes. The DPE was added in 5% excess to the living end at −80□° C. The proton trap was 2,6-di-tert-butylpryridine (DTBP).

After 200 minutes reaction time prechilled methanol was added and the reaction mixture was poured into 10% ammonia methanol. The hexane phase was separated and the methanol was extracted twice with hexane. The combined hexane solution was washed with water until neutral and dried over anhydrous Na$_2$SO$_4$. The hexane was evaporated and the polymer dried in a vacuum oven for 36 hours. According to $^1$H NMR and GPC measurement with double detection (UV and RI) capping was complete. The polymer carried exclusively —OMe end groups. This indicates that the diphenyl polyisobutenyl cation is fully ionized.

Example 3

In this example the TMPCl concentration was 0.002M. MeCl/HX 40/60 v/v solvent mixture was used. IB was polymerized with the TMPCl/TiCl$_4$ initiating system in the presence of 0.004M 2,6-di-tert-butylpyridine (DTBP) as proton trap (30 min, 100% conversion, M$_n$=2,100; M$_w$/M$_n$=1.20), then DPE was added. After different reaction time the reactions was quenched with MeOH, the product was washed with MeOH to remove any unreacted DPE and was dried in vacuum at about 50° C. The M$_n$ and MWD of the DPE capped samples were identical with the samples taken before the addition of DPE. The conversion calculation was based on H$^1$ MNR spectra using the following peaks: in-chain CH$_3$ at 1.12 ppm (ACH$_3$), in-chain CH$_2$ at 1.42 ppm (ACH$_2$), and the aromatic peaks in the range of ~7.1 to ~7.4 ppm (A$_{ar}$). The conversion of PIBCl (Conv) was calculated in two ways:

$$Conv_1 = 0.6 \times (DP) \times A_{ar}/ACH_3; \text{ and}$$

$$Conv_2 = 0.2 \times (DP) \times A_{ar}/ACH_2$$

where (DP) is the degree of polymerization of PIB (M$_n$/56.11). The average of the two results was used.

According to results with [TiCl$_4$]=0.0364M, MeCl/HX 40/60 v/v −80° C. 100% conversion is reached in about 50 minutes when the DPE is in 8% excess and in about 20 min when the DPE is in 117% excess.

Example 4

In this example the TiCl$_4$ concentration was 0.016M during capping. MeCl/HX 40/60 v/v solvent mixture was used. IB was polymerized in a more concentrated solution ([TMPCl]=0.00345M, [TiCl$_4$]=0.02765M, [IB]$_o$=0.1232M, [DTBP]=0.00691M, 30 minutes, 100% conversion, M$_n$=2,300, M$_w$/M$_n$=1.27) and then the reaction mixture was diluted and DPE was added. After the DPE addition [DPE]$_o$ became 0.00206M or 0.00412M, the [TiCl$_4$] was 0.016M, and [PIBCl]$_o$ was 0.00177M. From the results 100% conversion is reached in about 250 minutes DPE is in 16% excess and in 95 minutes with 133% excess.

Example 5

The experiments were repeated using MeCl/MeCH instead of MeCl/HX. The IB polymerization time was 45 minutes. Similarly to results with the MeCl/HX solvent mixture according to the results 100% conversion is reached in about 50 minutes when the amount of DPE is close to stoichiometric.

Example 6

In this example the TiCl$_4$ concentration was 0.016M during capping. IB was polymerized in a more concentrated solution ([TMPCl]=0.00345M, [TiCl$_4$]=0.02765M, [IB]$_o$=0.1232M, [DTBP]=0.00691M, 30 minutes, 100% conversion, M$_n$=2,300, M$_w$/M$_n$=b 1.27) and then the reaction mixture was diluted with solvent and DPE was added. After the DPE addition [DPE]$_o$ became 0.00206M or 0.00412M, the [TiCl$_4$] was 0.016M, and [PIBCl]$_o$ was 0.00177M.

According to the results 100% PIBCl conversion is reached in about 32.5 hours when the DPE is in 11% excess and in about 310 minutes with 123% DPE excess.

Example 7

In this example dicumyl acetate was used as initiator. MeCl/HX 40/60 v/v solvent mixture was used (PIB M$_n$=5400). The reaction conditions were the following: temperature=−80° C., [TMPCl]=0.018M, [IB]$_o$=1M, [TiCl$_4$]=0.289M, solvent: methyl chloride/hexane (MeCl/HX) 40/60 v.v mixture. The IB polymerization time was 15 minutes. The DPE was added in 85% excess to the living ends at −80° C. No proton trap was used. The DPE capping was complete after 30 minutes.

As is apparent from the foregoing description, the materials prepared and the procedures followed relate to specific preferred embodiments of the broad invention. It is apparent from the foregoing general description and the specific embodiments that, while forms of the invention have been illustrated and described, various modifications can be made without departing from the spirit and scope of this invention. Accordingly, it is not intended that the invention be limited thereby.

I claim:

1. A cationic polymer comprising cationically polymerized monomer endcapped with a non-polymerizable monomer.

2. The polymer of claim 1 wherein the capping compound is selected from the group consisting of substituted or unsubstituted diphenyl alkylene, substituted or unsubstituted a-methoxystyrene, substituted or unsubstituted trans-stilbene, substituted or unsubstituted 1-isopropenylnapthalene and substituted or unsubstituted 2,4-dimethyl-a-methylstyrene.

3. The polymer of claim 1 wherein the capping compound is 1,1-diphenylethylene and the cationically polymerized monomer is isobutylene.

4. The polymer of claim 1, wherein the cationically polymerized monomer is selected from the group consisting of C$_4$-C$_{18}$ monoolefin, C$_4$-C$_{14}$ multiolefin and substituted or unsubstituted vinylidene aromatic compounds.

5. The polymer of claim 4, wherein said monoolefin has a carbon atom chain length of four to ten carbon atoms.

6. The polymer of claim 5, wherein said monoolefin has a carbon atom chain length of four to 8 carbon atoms.

* * * * *